UNITED STATES PATENT OFFICE 1,927,588

PROCESS FOR THE TREATMENT OF WOOL AND OTHER ANIMAL FIBERS

Eugene Victor Hayes-Gratze, Kensington, London, England

No Drawing. Application August 19, 1931, Serial No. 558,101, and in Great Britain September 12, 1930

7 Claims. (Cl. 8—12)

This invention relates to a new or improved process for the treatment of wool and other animal fibers, whereby such fibers may be effectually scoured and prepared for subsequent operations, for instance carding and spinning.

As is well known the usual process for freeing wool from dirt and "suint" has been by scouring with an aqueous solution of soap or of an alkali. Wool has also been scoured by the use of organic grease solvents, such as petrol, ether, naptha, or carbon tetrachloride. Further, it has been proposed to treat wool, animal fibers and fibrous textile materials with sulphonated fats and oils, but all such processes have either more or less deleteriously affected the wool, or entailed lengthy and complicated operations, thereby increasing the cost of treatment. The primary object of the present invention is to overcome these drawbacks and produce a better product.

The present invention consists in treating a neutralized sulphonated oil to an electric ionization process either by electrolysis or by the action of high tension discharges of high or low frequency or by a combination of electrolysis and high tension discharges whereby the pH value is increased and using such oil or an aqueous solution thereof for the treatment of wool or other animal fibers.

Any suitable neutralized sulphonated oil may be employed, either a vegetable oil, a mineral oil, an animal oil, or a fish oil, but preferably vegetable oils, such as castor oil or olive oil, is employed, or a combination of such oils.

In carrying out the process according to the present invention, an oil—preferably castor oil—is first sulphonated, rendered neutral and then treated to an electric ionization process whereby the degree of ionization after dilution with 10 times the amount of water is such that the mixture has a pH value of not less than 7.

When the electric ionization process is effected by electrolytic action by means of a low tension current only a minute quantity of ozone is liberated and to increase the impregnation of the ionized oil with ozone—in order to produce a bleaching effect—the sulphonated oil is electrically ionized by a high tension discharge of a high or low frequency or the ionized oil which has been first treated to electrolysis may be again treated to a high tension discharge whereby the pH value is readily increased to such an extent that after dilution with 10 times its volume of water it is 7.5 or 8.

The ionization value of an oil which may be increased by ozonization depends on the pH value of its aqueous solution. The pH value is a number used to express the hydrogen ion concentration of a liquid and depends upon its active acidity or alkalinity, with decreasing acidity the corresponding pH values increase. According to the theory of electrolytic dissociation, all liquids, of which water is a constituent, contain free hydrogen and hydroxyl ions, if an excess of hydrogen ions be present the liquid is acid, and if alkaline then there is an excess of hydroxyl ions. Since the ionization value of a liquid depends on the grammes of ionized hydrogen per litre, the pH value determines the degree of ionization, for example pH=0.1 grammes of ionized hydrogen per litre, pH2=0.01 grammes of ionized hydrogen per litre, and so on to 14 decimal places. There are two methods of measuring pH values, the electrometric method in which the difference in potential between the hydrogen electrode immersed in the solution and a standard calomel electrode is measured and converted by calculation into pH and the more usually employed colorimetric method, which depends upon the use of indicators, which latter consist of organic colouring matters which change colour according to the pH of the liquid in which they are dissolved. In order to test the pH value of a solution by the colorimetric method, an acid indicator, for instance such as phenolphthalein may be used. Phenolphthalein is colourless in the undissociated state, that is in the presence of a trace of hydrogen ions, but as soon as the solution becomes alkaline the strongly dissociated salt of phenolphthalein is formed and the intense red of its negative ions appear. By comparison with a set of numbered standard tubes of varying colour intensity, the exact pH value of the solution under test may be obtained and such standard tubes constitute what is commonly known as the "phenol scale".

Such an electrically ionized oil is then preferably aerated and/or diluted with the required amount of water, say for instance 1 part (by volume) of oil up to 25 parts of water, the best proportion in practice has been found to be 1 part of oil to 15 to 20 parts of water, which solution leaves sufficient residual oil in the wool or fiber as to enable it to be carded and combed, thereby eliminating subsequent spraying or treatment with olive or other oil. The solution may be heated up to 100° C., but the most satisfactory temperature in practice is found to be between 43° C. and 60° C.

Any known bleaching agent may be added to the diluted oil, and it has been found in practice that such a bleaching agent may be hydrogen peroxide, sodium hypochlorite, sulphur dioxide, sodium peroxide, sodium bisulphite, or sodium hydrosulphite, a suitable percentage of the diluted solution is from 1 to 3% of hydrogen peroxide or from 1 to 5% of sodium hypochlorite, sodium peroxide, sulphur dioxide, sodium bisulphite or sodium hydrosulphite. The wool or other animal fiber is then washed or scoured with such oil or solution in any convenient machine or apparatus whereby the oil or solution is caused to freely circulate through the wool or fiber, after which the wool or fiber is squeezed to remove the oil or solution, the last traces of which may be removed by washing with water or with a second bath of weaker solution.

The ionization of oils by electrical discharges amounts to a form of dissociation into oxygen and hydrogen ions and the effect of the high tension discharge of high or low frequency is to impregnate the liquid with ozone.

It is found in practice that if the wool or fiber is immersed in a suitable tank containing the diluted oil solution and if this solution is forced into the tank in the form of jets, the wool or fiber is effectively scoured, or if air under pressure is injected into the solution the same effect is secured.

When air under pressure, or a mixture of air and oil solution, is forced through jets into the tank containing wool, the suint is separated and the fat (lanoline) rises to the surface, moreover such action tends to saponify the fat in solution.

The used oil or solution may be placed in a suitable receptacle to allow the dirt and impurities to settle and allow any surplus fat to rise to the surface, which may be removed and subsequently treated to a purification process.

In some cases, wool or animal fibers scoured by existing alkali or soap scouring processes may be treated with such electrically ionized oils or aqueous solutions of such oils in the final swilling or rinsing vat, thereby facilitating the carding, combing and spinning operations, and the fact that such oils have been proved to be absolutely anti-bacteriological and to a great extent fungicidal makes such treatment very valuable.

I declare that what I claim and desire to secure by Letters Patent is:—

1. A process for the treatment of wool and other animal fibers consisting in treating said fibers with a reagent prepared by treating a neutralized sulphonated oil to an electric ionization process, as set forth.

2. In a process for the treatment of wool and other animal fibers consisting in treating said fibers with a re-agent prepared by treating a neutralized sulphonated oil to an electric ionization process whereby such ionized oil after dilution with 10 times the amount of water has a pH value of not less than 7, as set forth.

3. A process for the treatment of wool and other animal fibers consisting in treating said fibers with a diluted re-agent prepared by treating a neutralized sulphonated oil to an electric ionization process by electrolysis, as set forth.

4. A process for the treatment of wool and other animal fibers consisting in treating said fibers with a diluted re-agent prepared by treating a neutralized sulphonated oil to an electric ionization process by the action of a high tension discharge of a high or low frequency, as set forth.

5. A process for the treatment of wool and other animal fibers consisting in treating said fibers with a reagent prepared by treating a neutralized sulphonated oil to an electric ionization process, diluting said reagent with water and adding thereto a bleaching agent, as set forth.

6. A process for the treatment of wool and other animal fibers consisting in immersing the wool or fibers in a solution of a neutralized sulphonated oil treated to an electric ionization process, causing the solution to freely circulate through the wool or fibers, squeezing the wool or fibers to remove the solution and subsequently washing with water, as set forth.

7. In a process for treating or scouring wool and other animal fibers by known alkali or soap scouring processes, subsequently treating said fibers with a solution of a neutral sulphonated oil electrically ionized which after dilution with 10 times the amount of water has a pH value of not less than 7.5, as set forth.

EUGENE VICTOR HAYES-GRATZE.